United States Patent
Persson et al.

(10) Patent No.: US 9,692,760 B2
(45) Date of Patent: Jun. 27, 2017

(54) BROWSER DEVICE ACCESS PROXY

(71) Applicant: Telefonaktiebolaget L M Ericsson (publ), Stockholm (SE)

(72) Inventors: Per Persson, Södra Sandby (SE); Magnus L Olsson, Åhus (SE); Song Yuan, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/353,331

(22) PCT Filed: Oct. 18, 2012

(86) PCT No.: PCT/EP2012/004366
§ 371 (c)(1),
(2) Date: Apr. 22, 2014

(87) PCT Pub. No.: WO2013/060432
PCT Pub. Date: May 2, 2013

(65) Prior Publication Data
US 2014/0282862 A1 Sep. 18, 2014

Related U.S. Application Data

(60) Provisional application No. 61/553,754, filed on Oct. 31, 2011.

(30) Foreign Application Priority Data

Oct. 28, 2011 (EP) .................................... 11187029

(51) Int. Cl.
*H04L 29/06* (2006.01)
*G06F 3/0484* (2013.01)
(Continued)

(52) U.S. Cl.
CPC ............ *H04L 63/10* (2013.01); *G06F 3/0484* (2013.01); *G06F 21/51* (2013.01); *G06F 21/55* (2013.01);
(Continued)

(58) Field of Classification Search
None
See application file for complete search history.

(56) References Cited

U.S. PATENT DOCUMENTS 6,970,935 B1 * 11/2005 Maes ................. H04L 29/06027
370/356
7,111,056 B1 * 9/2006 Ramey .............. H04M 3/42161
709/203

(Continued)

OTHER PUBLICATIONS

Nanda, Susanta; Lam, Lap-chung; Chiueh, Tzi-cker. Web Application Attack Prevention for Tiered Internet Services. ISIAS '08. Fourth International Conference on Information Assurance and Security, 2008. http://ieeexplore.ieee.org/stamp/stamp.jsp?arnumber=4627083.*

(Continued)

*Primary Examiner* — Jeremiah Avery
(74) *Attorney, Agent, or Firm* — Murphy, Bilak & Homiller, PLLC

(57) ABSTRACT

In a web browser (100) access is controlled with respect to at least one user data providing device (102), the web browser comprising a browser engine (106), a browser application (104) and a device access proxy, DAP (108). Access is acquired, in the DAP, to at least one user data providing device and a request is received from a web application (110) for user data from a first user data providing device. In response to the request, default data (112) is transmitted from the DAP to the web application. A user data access confirmation signal is obtained, and in response to the user data access confirmation signal, the transmission of the (Continued)

default data is discontinued and the requested user data is transmitted from the DAP to the web application.

15 Claims, 3 Drawing Sheets

(51) Int. Cl.
    *G06F 21/51*     (2013.01)
    *G06F 21/55*     (2013.01)
    *G06F 21/62*     (2013.01)
    *G06F 21/82*     (2013.01)
    *G06F 21/83*     (2013.01)
    *G06F 21/84*     (2013.01)
    *G06F 21/85*     (2013.01)
    *H04L 12/18*     (2006.01)

(52) U.S. Cl.
    CPC ...... *G06F 21/6245* (2013.01); *G06F 21/6263* (2013.01); *G06F 21/82* (2013.01); *G06F 21/83* (2013.01); *G06F 21/84* (2013.01); *G06F 21/85* (2013.01); *H04L 12/1822* (2013.01); *G06F 2221/2123* (2013.01); *G06F 2221/2127* (2013.01)

(56) References Cited

U.S. PATENT DOCUMENTS

| | | | | |
|---|---|---|---|---|
| 7,644,145 B2* | 1/2010 | Rockwell | ........... | G06Q 10/0875 358/1.15 |
| 8,340,633 B1* | 12/2012 | Rege | ........... | H04W 4/26 455/405 |
| 8,392,553 B2* | 3/2013 | Petropoulakis | ..... | G06F 11/3006 709/224 |
| 8,627,479 B2* | 1/2014 | Wittenstein | ......... | H04L 63/1425 380/255 |
| 8,931,041 B1* | 1/2015 | Banerjee | ............... | H04L 63/102 726/1 |
| 9,338,494 B2* | 5/2016 | McCoy | ........... | H04N 21/42219 |
| 2002/0078371 A1* | 6/2002 | Heilig | ................. | H04L 12/2856 726/4 |
| 2002/0083183 A1* | 6/2002 | Pujare | ...................... | G06F 8/65 709/231 |
| 2002/0099829 A1* | 7/2002 | Richards | ........... | G06F 17/30899 709/227 |
| 2002/0157089 A1* | 10/2002 | Patel | ........................ | G06F 8/65 717/178 |
| 2006/0282528 A1* | 12/2006 | Madams | ................. | H04L 12/58 709/224 |
| 2007/0094691 A1* | 4/2007 | Gazdzinski | ........ | H04N 7/17318 725/62 |
| 2007/0185992 A1* | 8/2007 | Simpson | ................. | G06F 21/31 709/225 |
| 2007/0226304 A1* | 9/2007 | Virk | ..................... | G06Q 10/107 709/206 |

OTHER PUBLICATIONS

Wang, Haipeng; Zhou, Xingshe; Zhang, Yong; Zhang Tao. Information Stream Oriented Content Adaptation for Pervasive Computing. Proceedings, The 2005 IEEE International Conference on e-Technology, e-Commerce and e-Service. http://ieeexplore.ieee.org/stamp/stamp.jsp?arnumber=1402378.*

Oprea, Alina; Balfanz, Dirk; Durfee, Glenn; Smetters, D.K. Securing a Remote Terminal Application with a Mobile Trusted Device. 20th Annual Computer Security Applications Conference. Pub. Date: 2004. http://ieeexplore.ieee.org/stamp/stamp.jsp?arnumber=1377251.*

Adobe, "Flash Player Help", Context sensitive help for Adobe Plugin. Available online at: http://web.archive.org/web/20110717205939/http://www.macromedia.com/support/documentation/en/flashplayer/help/settings_manager06.html. Oct. 4, 2011.

Unknown, Author, "Adobe Flashplugin 11.01.152 final is released", Ubuntu Forums. Available online at: http://ubuntuforums.org/showthread.php?t=1854553. Oct. 4, 2011, 1-4.

Unknown, Author, "The Display (GUI) Layer", eXtropia tutorials. Available online at: http://web.archive.org/web/20001119171800/http://extropia.com/tutorials/devenv/gui.html. Nov. 19, 2000, 1-10.

* cited by examiner

BROWSER DEVICE ACCESS PROXY

TECHNICAL FIELD

The present disclosure relates to controlling access to user data in a web environment

BACKGROUND

Web browsers are becoming more and more important as application platforms across all kinds of equipment; computers, pads, smartphones, etc. However, much of the functionality required by applications is provided by third party plug-ins. The functionality provided by the plug-ins is crucial to many successful web applications existing today. Examples of plug-ins include ADOBE FLASH and MICROSOFT SILVERLIGHT.

Nevertheless, plug-ins are also a source of problems, both in terms of security and usability and the upcoming fifth revision of the HyperText Markup Language standard (HTML5) is therefore aimed at eliminating (or at least reduce) the need for third party plug-ins. One area where plug-ins are required today is video conferencing, and HTML5 therefore addresses this use case with a set of appropriate application programming interfaces (APIs) that will provide camera and microphone access to web apps.

Devices with advanced browser implementations enable access to functionality able to expose more personal (and thus sensitive) user data such as recordings via a video camera, audio via a microphone and even sensors for biometric data such as heart beat and blood pressure. It goes without saying that it has been seen as vital to also manage and control the access to such sensitive data in order to not lose the trust and confidence of end users that are using browsers.

However the need to protect the end-user also has a clear impact on implementations of devices and browsers and many service providers see this as a business opportunity in itself. Standards work has been proposed to introduce access control to APIs that operate as a front for accessing sensitive user data resources but not without complications. Existing solutions, and the relevant parts of the suggested HTML5 standards, are based on a security/privacy concept where the user is prompted with a modal dialog on each request from a web application or a web site that requests access to devices like the camera, microphone, location data provider, etc.

As an example, access to a camera is given to a web application in response to the JavaScript API getUserMedia ("video", callback). First the user is prompted for device access, and can select from the available devices in a modal dialog. The video stream is returned in the callback to the web application and dispatched when the modal dialog is dismissed.

The problem with a modal dialog is two-fold: first, modal dialogs tend to annoy the user since all execution is stopped until the user has acknowledged the dialog by granting or denying access. Many users therefore get in the habit of just "OK"-ing all modal dialogs immediately on sight without reflecting over the consequences of granting access. Secondly, once access is granted or denied, there is no way for the user to, at a later point in time, get an overview of what devices a web application or web page has been granted or denied access to, or change the way in which devices are accessed.

Attempts have been made in the standardization work to provide a more explicit access control mechanism as part of the application layer/APIs. However, these suggested mechanisms have not been accepted by all involved parties, typically due to the impact on implementations adding cost and reducing flexibility on the design relating to user-experience. Consequently these attempts have failed and any attempts to define a standards based explicit access control have been stopped in its tracks.

SUMMARY

It is an object to obviate at least some of the above disadvantages and therefore there is provided, according to a first aspect, a method in a web browser for controlling access to at least one user data providing device, the web browser comprising a browser engine, a browser application and a device access proxy, DAP, the method comprising acquiring, in the DAP, access to at least one user data providing device, receiving, in the DAP, a request from a web application for user data from a first user data providing device, in response to the request, transmitting default data from the DAP to the web application, obtaining, in the DAP, a user data access confirmation signal, and in response to the user data access confirmation signal, discontinuing the transmission of the default data and transmitting the requested user data from the DAP to the web application.

The acquiring of access to at least one user data providing device can comprise disabling the web application from accessing the at least one user data providing device.

The obtaining of a user data access confirmation signal can comprise receiving user input from the browser application. Furthermore, the obtaining of a user data access confirmation signal can comprise receiving a signal from a DAP policy function.

A selection of a second user data providing device can be detected in the browser application and in response to the detected selection, any transmission to the web application can be discontinued and user data provided by the second user data providing device can be transmitted from the DAP to the web application. Furthermore, a selection of a second user data providing device can be obtained from a DAP policy function, and in response to the obtained selection, any transmission to the web application can be discontinued and user data provided by the second user data providing device can be transmitted from the DAP to the web application.

The policy function can comprise rules that regulate trust levels associated with web applications. The policy function can comprise a function to receive rules settings from a user. The policy function can comprise rules that regulate content of the default data.

The user data can comprise any of: image data, a video sequence, an audio sequence, position information, sensor data.

The default data can be acquired in the DAP from a default data source and the acquiring of the default data can comprise any of acquiring a video sequence, acquiring an audio sequence, acquiring at least one still image.

The acquiring, in the DAP, of the default data can be performed as a reaction to a detection of a user data providing device being available.

In other words, to summarize, a web browser is improved by way of introduction of a device access proxy, DAP, that can be part of the browser implementation. For example, on browser startup the DAP acquires access to available user data providing devices in the platform. Devices that are plugged in/unplugged or attached/detached in any way can be added/removed from connection with the DAP dynamically. The DAP has a default stream, e.g. one default stream for each type of user data device. A default stream is a "fake" stream, a benign data stream such as a test image or a pre-recorded video that serves as a placeholder transmission to the web application until a requested data stream is confirmed to be transmitted to the web application.

Such a method is advantageous in that it gives a user full control over external, i.e. web application, access to local devices such as a camera, microphone, and location/position providing devices without the need for modal dialogs. Furthermore, it works nicely with the HTML5 standards as they are currently evolving. An added benefit is that the user can have an overview (or transparency) of the outgoing information. For example, a browser vendor (as opposed to the web app developer) may provide a self-view on outgoing video streams from the camera that cannot be disabled by the web application or a third party e.g. developer or content owner.

Moreover, such a method involving a DAP recognizes the proxy's inherent capability to intercept and re-route information. This is advantageous as it not only plays an important part in protecting end-user privacy but also enable a significant motivation for value added services to be engaged in the wake of e.g. a privacy screen functionality. This is an important business driver that will motivate browser and device vendors to include support for an additional architecture element in the form of a DAP. In other words there will be revenue streams that help to pay for the added development effort.

According to a second aspect, there is provided a computer program product comprising software instructions that, when executed in a processor, performs the method as summarized above.

According to a third aspect, there is provided an apparatus comprising processing circuitry configured to perform the method as summarized above.

The effects and advantages of these further aspects correspond to the effects and advantages as summarized above in connection with the first aspect.

DETAILED DESCRIPTION OF EMBODIMENTS

Figure 1:
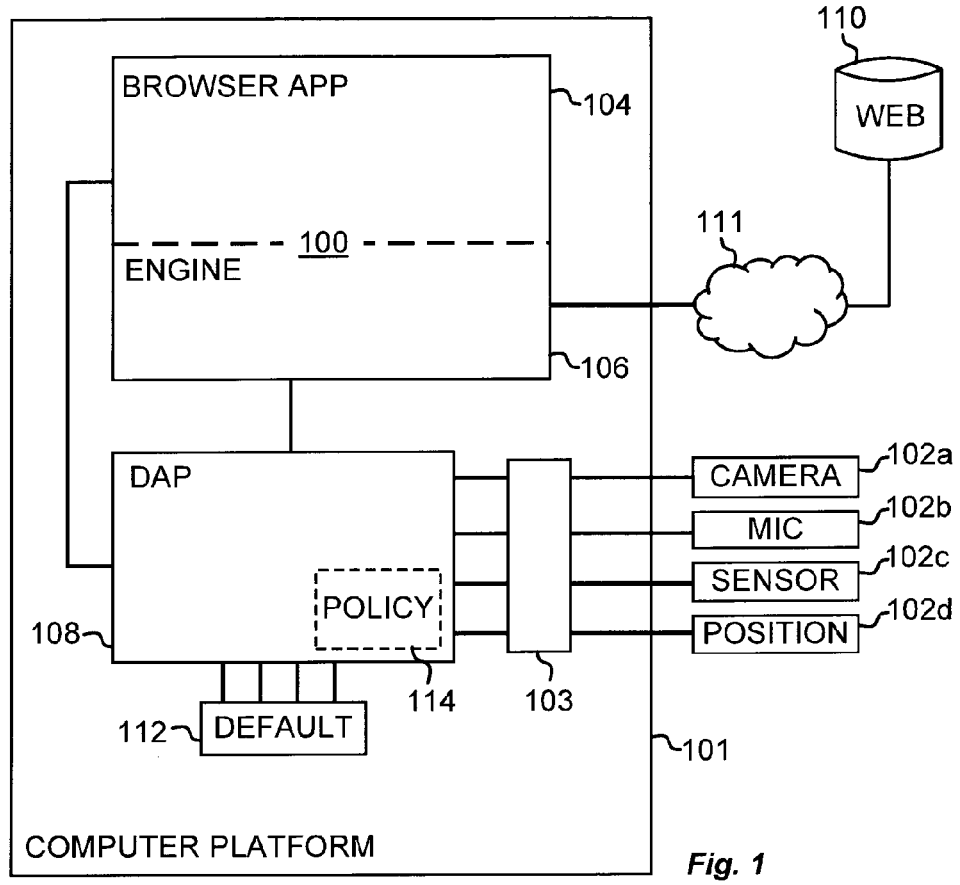
FIG. 1 schematically illustrates a functional block diagram of interacting functions involved in controlling access to user data providing devices.

FIG. 1 illustrates schematically a functional block diagram of interacting functions involved in controlling access to user data providing devices. A web browser 100 is running on a computer platform 101. The web browser 100 comprises a browser application 104 and an engine 106. The web browser 100 interacts with a web application 110 via a network, such as the Internet, 111 and the engine 106 in collaboration with the browser application 104 interact with a user (not shown in FIG. 1), as is known in the art, for example via a display, a keyboard and other user interface arrangements.

Forming part of the web browser 100 is also a device access proxy (DAP) 108 that has access to user data providing devices 102a-d, here exemplified by a camera 102a, a microphone 102b, a sensor device 102c and a position providing device 102d. The sensor device 102c can be any type of sensor capable of sensing, e.g., biometric parameters or more general environmental parameters. The position providing device 102d can be any type of device capable of providing information regarding a spatial position, such as a GPS device. These user data providing devices 102a-d are connected to the DAP 108 via interface circuitry 103, which comprises hardware as well as software/firmware as is known to the skilled person. Also connected to the DAP 108 is a default data source 112 that can provide benign data, as will be described in further detail below.

The computing platform 101 may be any suitable type of device including a personal computer, a set-top box interacting with a display screen, a mobile communication terminal such as a mobile phone or a tablet computer etc.

Figure 2:
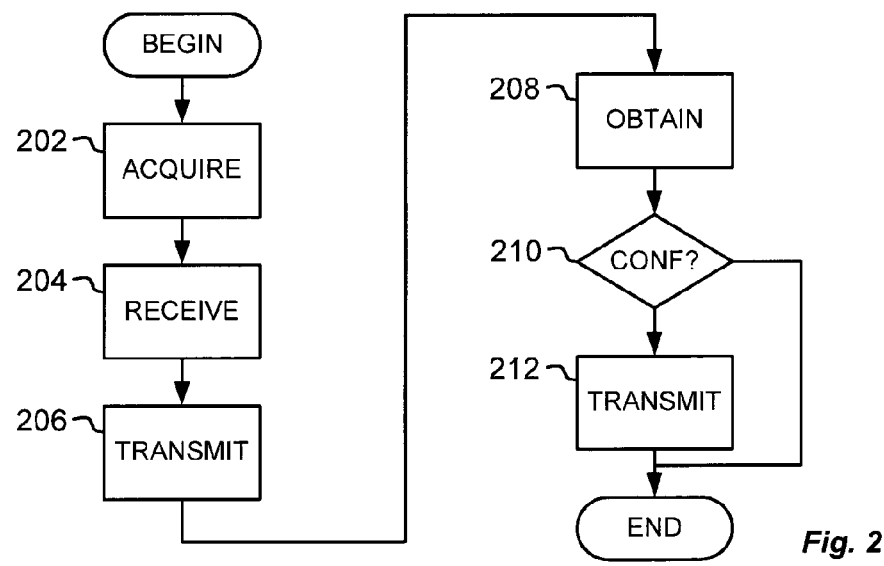
FIG. 2 is a flow chart of a method for controlling access to at least one user data providing device.

Turning now to FIG. 2 and with continued reference to FIG. 1, a method for controlling access to at least one user data providing device 102 will be described.

The method is executed under the control of the web browser and it commences with an acquiring step 202 where the DAP acquires access to at least one user data providing device 102, for example any of user data providing devices 102a-d. The DAP then receives, in a reception step 204, a request from a web application for user data from a first user data providing device, e.g. the camera 102a. In response to the request, default data is transmitted in a transmission step 206, from the DAP 108 to the web application. A user data access confirmation signal is then obtained, in an obtaining step 208, and in response to the user data access confirmation signal, the transmission of the default data is discontinued and the requested user data is transmitted from the DAP to the web application, as illustrated by a decision step 210 and transmit step 212.

It is to be noted that the obtaining of the user data access confirmation signal and the transmission of user data that follows as a result of the confirmation signal does not involve, as is typical in prior art, any modal dialog that interrupts the method. Default data continues to flow until the confirmation signal is obtained and the web application receiving the data is not informed of the change of source of data from default data to user data, i.e. the web application is "unaware" of the change of data source.

Figure 3:
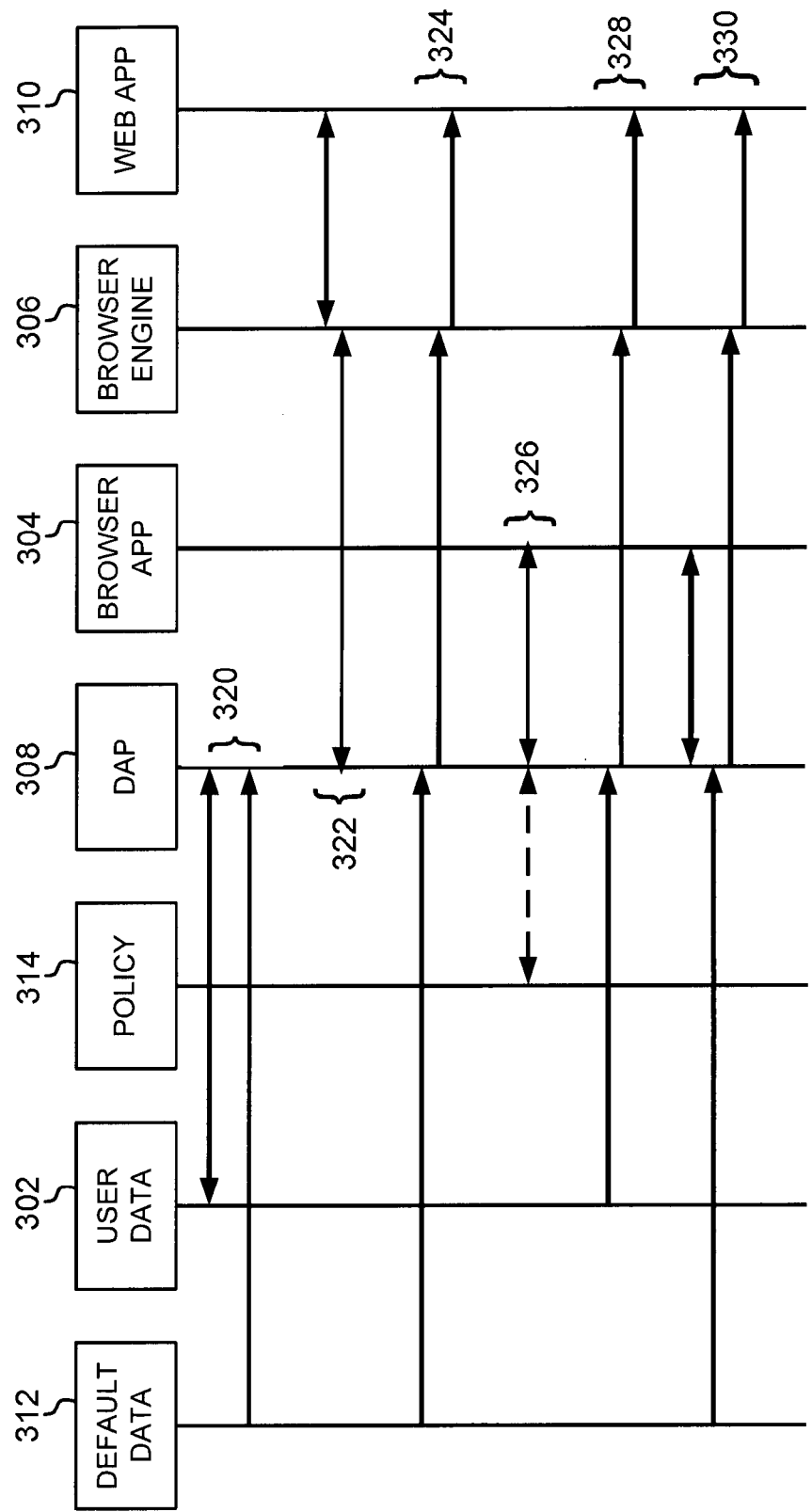
FIG. 3 is a signaling diagram that schematically illustrates communication between functions involved in controlling access to user data providing devices, and FIG. 4 schematically illustrates a web browser during a chat session involving control of access to user data providing devices.

FIG. 3 is a schematically illustrated signaling diagram of an implementation of a method such as the method described above in connection with FIG. 2. The signaling diagram shows communicating nodes in the form of a web application 310, web browser components in the form of a browser engine 306 and a browser application 304. A DAP 308 with an associated policy function 314 are shown and a user data providing device 302 and a default data provider 312. All nodes in FIG. 3 are similar to the blocks of the block diagram of FIG. 1.

A first signalling and data transfer sequence 320 takes place where the DAP 308 exchanges signalling information with, and thereby acquires access to, the user data providing device 302 and during which a connection with the default data provider 312 is established such that default data can be obtained by the DAP from the default data provider 312 at any time.

Signalling then takes place in a second sequence 322, between the web application 310 and the DAP 308 via the browser engine 306. During this sequence 322 a request from the web application 310 for user data from the user data providing device 302 is received by the DAP 308.

Default data is then provided, from the default data provider 312, via the DAP and the browser engine 306 to the web application 310 during a third signalling and data transfer sequence 324.

The provision of default data continues until a user data access confirmation signal is received by the DAP 308 from the browser application 304, as illustrated by a fourth signaling sequence 326. As an alternative to reception from the browser application 304, signaling may take place during this sequence 326 with the policy function 314. In response to the user data access confirmation signal, the transmission of the default data is discontinued and the requested user data is transmitted from the DAP 308 to the web application 310, as illustrated by a fifth signaling and data transfer sequence 328. As noted above, default data continues to flow until the confirmation signal is obtained and the web application 310 receiving the data is not informed of the change of source of data from default data provider 312 to the user data providing device 302, i.e. the web application is "unaware" of the change of data source.

A sixth signaling and data transfer sequence 330 is illustrated in FIG. 3 in order to show that, during transmission of user data from the user data providing device 302 to the web application 310, signaling can take place between the browser application 304 and the DAP 308 that results in a discontinuation of transmission of user data and re-starting transmission of default data to the web application.

An example of a method similar to the methods illustrated in FIGS. 2 and 3 can be described in terms of a HTML5/JavaScript programming model. In such a model, a web application/website can call getUserMedia( ) to get access to one or more user data providing devices.

In the prior art, what typically happens is that a modal prompt is presented to the user with a list of user data providing devices of the requested type. Once the user has selected a specific device, a user data stream of that device will be returned to the web application. After the user data stream is obtained by the web application, it can be manipulated in different ways. For example, in the case of a camera device, the video data stream provided by the camera can be attached to a local HTML5 Video element for local video playback. The video data stream can also be transmitted to another peer over the network via HTML5 PeerConnection to establish a video chat. The web application/website can also gain access to a data stream from another type of device, such as an external USB storage device. JavaScript can read such a data stream byte by byte and send the data over to a server. That is, in such a conventional programming model, there is no way to revoke or modify the granted device access or data stream.

In contrast, using the device access proxy (DAP) as summarized above, the call to getUserMedia( ) goes directly to the DAP which will immediately grant access without requiring user interaction, and return a proxy stream in the form of a default data stream to the web application. The default stream can still be manipulated by the web application like a real device stream, i.e. as a data stream from a user data providing device such as devices 102a-d in FIG. 1. As illustrated in FIG. 1, the DAP can obtain and configure data content from user data providing devices to go into a data stream for transmission to the web application. The default stream that the DAP provides is bound with the stream provided by the DAP from the beginning. Unlike conventional prior art solutions, a user can always use a status view for an overview of the currently granted device accesses and make further decisions of the bound stream.

Figure 4:
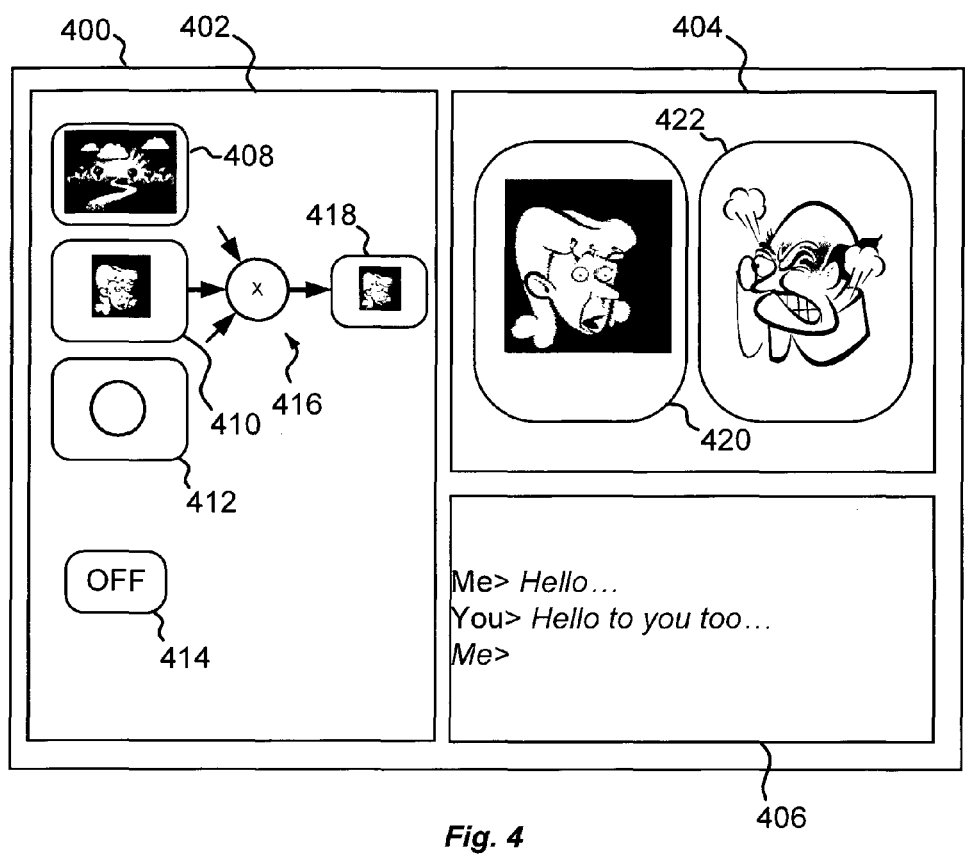

To indicate to the user that a web application/web site has requested access, part of the web browser application/chrome (i.e. outside of HTML view) change state, and provides a means to display a status view. FIG. 4 illustrates schematically such a situation where a web browser window 400 comprises a status frame 402 and frames 404 and 406 showing text and video output and during a chat session between a local user 420 and a remote user 422. The status frame 402 shows data that can be provided by available devices including a camera 410, a microphone 412 and a default source 408 in the form of an advertisement video sequence, and the current outgoing stream 418 (here in the form of a self-view from the camera 410). The user can select, via a selector tool 416, any stream to become the outgoing stream, and the self-view is updated accordingly. The status view may be revisited at any time, and the outgoing stream may be changed at any time by selection via the selection tool 416 or stopped by activation of a stop button 412.

These example implementation details of the DAP are completely hidden to the web application. The web application only gains access to data streams via the DAP and it is able manipulate these stream in whatever way that is made possible by JavaScript.

The description above use camera and external USB storage devices as example, but the DAP is not only used for selection of multiple streams. It can be used for granular control for many other kinds of device access. Consider geolocation device access: when a web application/web site requests location information from a user, the default data can be of low granularity, e.g. in the form of "Northern Hemisphere", but the user may at any time refine this by changing the precision, such as "Country>state>city>street>address".

DAP Policy Function

It has already been described that the DAP function can be managed by an end-user in response to an application requesting access to a resource such as a user data providing device. However given the executive power (enforcement capability) of the DAP function e.g. as it intercepts resources prior to an application can consume the resources, the DAP function can also be controlled and managed by other means such through an application of a policy control mechanism. A DAP may thus act as a policy control and enforcement point.

Features of a DAP Policy function can include DAP Policy Manifest, origin of DAP Policy and cascading of DAP Policy.

With regard to DAP Policy Manifest, policy is typically understood as an expectation of a specific behavior in response to a given set of parameters and state (context) of a resource affected by that policy.

Of particular interest to DAP is a policy framework able to define a set of rules (a manifest) and actions as well as connecting those actions to a known set of external parameters such as authenticity of application e.g. digitally signed and verifiable source (e.g. embedded developer id), general device state such as low power mode or in charging dock or location based state etc., and intended recipient and consumer of resource e.g. who will receive a video stream and if that recipient can be securely identified and/or the stream securely delivered e.g. using a mechanism such as high-bandwidth digital content protection (HDCP).

Policy logic can be defined using an encoded format such as in a manifest that can be pre-loaded into a device (or as a URI) or be downloaded on demand. A logic can also be created using programmatic code Javascript (or in JSON format) or using a declarative XACML. A logic response can also be embedded in a protocol such as a HTTP RESTful dialogue. Policy can also be part of an implementation of a DAP or part of the resource itself (implementation). Scope of a DAP policy can be generic or specific to a particular type of resource, for example specific to a type of user data providing device.

Example of a generic DAP policy rule could be an input resource class, such as a video camera or a microphone etc., is always blocked unless enabled by an explicit policy such as a policy based on end-user preferences.

Example of a specific DAP policy for a resource could be a rule prohibiting recording (e.g. successive readings of a sensor) of heart beats or blood pressure data due to concerns of end-user privacy unless otherwise enabled by a more prominent policy (e.g. managed by an eHealth provider).

Origin of DAP Policy

Regarding the origin of DAP Policy, a user, a device manufacturer, a network provider, a service provider are all examples of principals that are originators of a policy. Even an application may provide a suggested policy (or manifest) to provide a declaration of intended use in order to support an end-user decision to adopt a specific policy. Typically, a principal is someone other than the application that can oversee/manage what access to grant (or re-route) to an application based on a declared or scripted policy.

Cascading of DAP Policy

As several principals can be envisioned it is also important to allow for co-existence in a predictable way e.g. device manufacturer typically provide a default policy for any device resource. Even if end-user is typically regarded as the primary owner of any privacy sensitive resource the management of that resource can be handled by another party e.g. the service provider on the end-users behalf.

The order of how to apply several layers (or cascades) of a policy is important to manage. Also the way how to combine overlapping policies can affect the end-result and is equally important to understand in order to have a predictable behavior of a DAP policy mechanism.

Also security threats may become possible if the order when cascading several policies is not well defined e.g. by a "man in the middle" attack that could inject another default policy at a lesser controlled cascade entry point.

How several policies may override each other in a predictable way or if a specific policy can not be obtained and how it should fall back to a "default" (or implicit) policy. Device implementations provide the default that can be superseded by an end-user applied policy, e.g. commonly handled as part of end-user preferences/settings. As part of a service agreement the service provider (can be network provider or operator or app store front provider etc.) can also provide a more advanced and granular definition of a policy that can be applied and modified if needed. For example, policy ordering when several overlapping policies exist can be as follows:

1. Regulative Rules on a certain market (may be part of implementation).
2. Device Implementation e.g. part of browser implementation decided by manufacturer.
3. End-User preferences e.g. never start with a live camera feed.
4. Network operator provided policy via Device Management (OMA DM).

It is however to be noted that the rationale for the content (or meaning) of a certain policy can be seen as a combination of business model, regulative rules, implementation or plainly user-preferences.

By the nature of cascading, a set of policies may be either mutually exclusive or complementing where exclusive has the meaning: in the presence of a more prominent policy a lesser (or default) policy may be superseded/replaced by the more prominent policy for a particular resource. A complementing set of policies has the meaning: a default policy stating that a device resource must not be exposed to an application can be somewhat relaxed as it may replace a blocked video stream with a commercial stream (still not jeopardizing/violating a policy created to protect end-user privacy).

Hence, to summarize advantages of the use of a browser device access proxy, DAP, without affecting existing standards in any major way the DAP solves problems of allowing access to sensitive (e.g. in terms of privacy and security wise) information, by providing non-modal (asynchronous) controls. A user can always view and change a decision at any time regarding which user data to allow. A user will always know what user data is being transmitted to another party, e.g. a web application. The DAP can act as policy enforcement control point.

The invention claimed is:

1. A method in a web browser for controlling access to at least one user data providing device, the web browser comprising a browser engine, a browser application and a device access proxy (DAP), wherein the method comprises:
    acquiring, in the DAP, access to at least one user data providing device;
    receiving, in the DAP, a request from a web application for user data from a first user data providing device;
    in response to the request, transmitting default data from the DAP to the web application, wherein said transmitting of default data comprises a continuing flow of default audio data and/or default video data;
    obtaining, in the DAP, a user data access confirmation signal; and
    in response to the user data access confirmation signal, discontinuing the transmission of the default data, thereby discontinuing the continuing flow of default audio data and/or default video data, and transmitting the requested user data from the DAP to the web application.

2. The method of claim 1, wherein the acquiring of access to at least one user data providing device comprises disabling the web application from accessing the at least one user data providing device.

3. The method of claim 1, wherein the obtaining of a user data access confirmation signal comprises receiving user input from the browser application.

4. The method of claim 1, wherein the obtaining of a user data access confirmation signal comprises receiving a signal from a DAP policy function.

5. The method of claim 1, comprising:
    detecting, in the browser application, a selection of a second user data providing device; and,
    in response to the detected selection, discontinuing any transmission to the web application and transmitting user data provided by the second user data providing device from the DAP to the web application.

6. The method of claim 1, comprising:
    obtaining, from a DAP policy function, a selection of a second user data providing device; and, in response to the obtained selection, discontinuing any transmission to the web application and transmitting user data provided by the second user data providing device from the DAP to the web application.

7. The method of claim 4, wherein the DAP policy function comprises rules that regulate trust levels associated with web applications.

8. The method of claim 4, wherein the policy function comprises a function to receive rule settings from a user.

9. The method of claim 4, wherein the policy function comprises rules that regulate content of the default data.

10. The method of claim 1, wherein the user data comprises any of: image data, a video sequence, an audio sequence, position information, sensor data.

11. The method of claim 1, comprising acquiring, in the DAP, the default data from a default data source.

12. The method of claim 11, wherein the acquiring of the default data comprises any of:
    acquiring a video sequence;
    acquiring an audio sequence; and
    acquiring at least one still image.

13. The method of claim 11, wherein the acquiring, in the DAP, of the default data is performed as a reaction to a detection of a user data providing device being available.

14. A non-transitory computer-readable medium comprising, stored thereupon, software instructions that, when executed in a processor providing a web browser for controlling access to at least one user data providing device, the web browser comprising a browser engine, a browser application and a device access proxy (DAP), cause the processor to:
    acquire, in the DAP, access to at least one user data providing device;
    receive, in the DAP, a request from a web application for user data from a first user data providing device;
    in response to the request, transmit default data from the DAP to the web application, wherein said transmitting of default data comprises a continuing flow of default audio data and/or default video data;
    obtain, in the DAP, a user data access confirmation signal; and
    in response to the user data access confirmation signal, discontinue the transmission of the default data, so as to discontinue the continuing flow of default audio data and/or default video data, and transmit the requested user data from the DAP to the web application.

15. An apparatus comprising processing circuitry configured to provide a web browser for controlling access to at least one user data providing device, the web browser comprising a browser engine, a browser application and a device access proxy (DAP), wherein the processing circuitry is further configured to:
    acquire, in the DAP, access to at least one user data providing device;
    receive, in the DAP, a request from a web application for user data from a first user data providing device;
    in response to the request, transmit default data from the DAP to the web application, wherein said transmitting of default data comprises a continuing flow of default audio data and/or default video data;
    obtain, in the DAP, a user data access confirmation signal; and
    in response to the user data access confirmation signal, discontinue the transmission of the default data, so as to discontinue the continuing flow of default audio data and/or default video data, and transmit the requested user data from the DAP to the web application.

* * * * *